(12) United States Patent
Iwanaga

(10) Patent No.: US 7,259,957 B2
(45) Date of Patent: Aug. 21, 2007

(54) LAMINATED CERAMIC CAPACITOR

(75) Inventor: Daisuke Iwanaga, Tokyo (JP)

(73) Assignee: TDK Corporation, Tokyo (JP)

( * ) Notice: Subject to any disclaimer, the term of this patent is extended or adjusted under 35 U.S.C. 154(b) by 249 days.

(21) Appl. No.: 11/191,977

(22) Filed: Jul. 29, 2005

(65) Prior Publication Data

US 2006/0177678 A1 Aug. 10, 2006

(30) Foreign Application Priority Data

Jul. 29, 2004 (JP) ............. P2004-222429

(51) Int. Cl.
*H01G 4/06* (2006.01)
(52) U.S. Cl. ............... 361/321.1; 361/321.2; 361/311; 361/312; 361/313; 361/306.1; 361/306.3; 257/295; 257/296
(58) Field of Classification Search ............ 361/321.1, 361/321.2, 311–313, 306.1, 306.2, 306.3, 361/303–305; 257/295, 296
See application file for complete search history.

(56) References Cited

U.S. PATENT DOCUMENTS 5,786,978 A * 7/1998 Mizuno ............. 361/321.5
6,011,683 A * 1/2000 Dat .................. 361/306.1
6,043,174 A * 3/2000 Maher et al. ........... 501/137
6,128,177 A * 10/2000 Titulaer et al. .......... 361/305
6,522,521 B2 * 2/2003 Mizuno et al. ......... 361/321.4
6,559,084 B1 * 5/2003 Fujikawa et al. ........ 501/139
6,710,998 B1 * 3/2004 Saito et al. ............ 361/313

FOREIGN PATENT DOCUMENTS

JP 3370933 B2 11/2002

* cited by examiner

Primary Examiner—Nguyen T. Ha
(74) Attorney, Agent, or Firm—Oliff & Berridge, PLC

(57) ABSTRACT

The capacitor 10 (laminated ceramic capacitor) of the invention comprises a capacitor body 11 wherein internal electrodes 12 (electrodes) and a dielectric layer 14 are alternately laminated, and external electrodes 15 are provided on the end faces thereof. The dielectric layer 14 has a site containing particles of a dielectric material which is formed of only one of these particles in its thickness direction. Regions 24 comprising at least one element selected from a group comprising Si, Li and B are scattered between the internal electrodes 12 and dielectric layer 14.

7 Claims, 3 Drawing Sheets

LAMINATED CERAMIC CAPACITOR

BACKGROUND OF THE INVENTION

1. Field of the Invention

The present invention relates to a laminated ceramic capacitor.

2. Related Background of the Invention

A laminated ceramic capacitor generally has a structure wherein a dielectric layer of a ceramic material and an internal electrode are laminated alternately. In recent years, a demand has emerged for a small laminated ceramic capacitor having a large electrostatic capacitance. In order to satisfy this demand, in laminated ceramic capacitors, the dielectric layer is being made thinner, and the number of laminated layers is increasing.

In one example of such a laminated ceramic capacitor known in the art, the dielectric layer has a structure formed only of single ceramic material particles, i.e., a one layer-one particle structure (e.g., JP-B No. 3370933).

SUMMARY OF THE INVENTION

However, when the dielectric layer in the laminated ceramic capacitor is made thinner, if the number of laminated layers increases, a deformation tends to arise in the dielectric layer. As a result, a partial gap appears between the internal electrodes and dielectric layer, and due to this, delamination between the internal electrodes and dielectric layer occurs easily.

It is therefore an object of the invention, which was conceived in view of the problems inherent in the aforesaid prior art, to provide a laminated ceramic capacitor wherein, even if the dielectric layer is made thinner to obtain a high electrostatic capacitance, delamination between the internal electrode and dielectric layer does not occur easily.

To resolve the aforesaid problem, the laminated ceramic capacitor of the invention comprises a pair of electrodes, a dielectric layer disposed between this pair of electrodes which is formed of a dielectric material comprising a ceramic material, wherein the dielectric layer contains particles of the aforesaid dielectric material and has a site formed of only one of these particles in its thickness direction, and regions containing at least one type of element selected from among a group comprising Si, Li and B are scattered between the electrodes and the dielectric layer.

Hence, in the laminated ceramic capacitor according to the invention, plural regions containing Si, Li or B are scattered between the internal electrodes and the dielectric layer. The internal electrodes and dielectric layer which are stuck together via these regions, can be stuck together more firmly than if they were stuck together directly. As a result, in the laminated ceramic capacitor having the aforesaid structure, delamination between the internal electrodes and dielectric layer does not occur easily although it has a thin dielectric layer having a one layer-one particle structure.

In the laminated ceramic capacitor having the aforesaid structure, the regions containing the aforesaid elements are preferably formed in a part surrounded by the internal electrodes and two or more of the aforesaid dielectric particles. By forming the regions in these parts, adhesive properties between the internal electrodes and dielectric layer are further enhanced.

Another laminated ceramic capacitor according to the invention comprises a pair of electrodes, a dielectric layer disposed between this pair of electrodes which is formed of a dielectric material comprising a ceramic material, wherein the dielectric layer contains particles of the aforesaid dielectric material and has a site formed of only one of these particles in its thickness direction, first regions containing at least one type of element selected from among a group comprising Si, Li and B are scattered between the electrodes and the dielectric layer, second regions containing at least one type of element selected from among a group comprising Si, Li and B are scattered in the dielectric layer, and the first regions are scattered more numerous than the second regions.

Thus, the laminated ceramic capacitor according to the invention may have regions containing the aforesaid elements not only in the interface parts between the internal electrodes and the dielectric layer, but also in inner layer parts of the dielectric layer. Since the aforesaid regions are formed between the electrodes and particles of dielectric material (dielectric layer), delamination of the two does not occur easily even in the case of a laminated ceramic capacitor having the aforesaid structure.

In the prior art laminated ceramic capacitor, the elements Si, Li or B are added as sintering agents to the dielectric layer, and they have the effect of lowering the sintering temperature during manufacture of the capacitor. However, as these sintering agents tend to have a lower resistance than the ceramic material forming the dielectric layer, if a large amount of sintering agent is added to obtain a practical sintering temperature, low resistance regions containing this sintering agent become widely distributed in the dielectric layer, and the insulation of the dielectric layer may break down as a result.

On the other hand, in the laminated ceramic capacitor of the invention, as described hereintofore, more regions containing oxides of Si, Li and B are formed in parts adjacent to the internal electrodes than in the inner layer parts of the dielectric layer. In other words, there are few low resistance regions containing Si, Li and B in the inner layer parts of the dielectric layer. Thus, although the laminated ceramic capacitor of the invention does contain Si, Li and B oxides, insulation breakdown of the dielectric layer does not occur so easily as in the laminated ceramic capacitor of the prior art where a sintering agent is added.

In the laminated ceramic capacitor having the aforesaid structure, the first regions are preferably surrounded by the internal electrodes and two or more of the aforesaid particles, and the second regions are preferably surrounded by only three or more of the aforesaid particles. Due to this, adhesion properties between the internal electrodes and dielectric layer are further enhanced, and the insulating properties of the dielectric layer are enhanced.

In these laminated ceramic capacitors, the regions containing at least one of the elements Si, Li and B, are preferably regions containing mainly Si. In this case, adhesion properties between the internal electrodes and dielectric layer are still further enhanced, and a satisfactory insulation resistance is obtained.

Also, the ceramic material is preferably a complex oxide having Ba and Ti as its principal ingredients. In this case, a ceramic capacitor having superior electrostatic capacitance and high insulation resistance is obtained.

DESCRIPTION OF THE PREFERRED EMBODIMENTS

Figure 1:
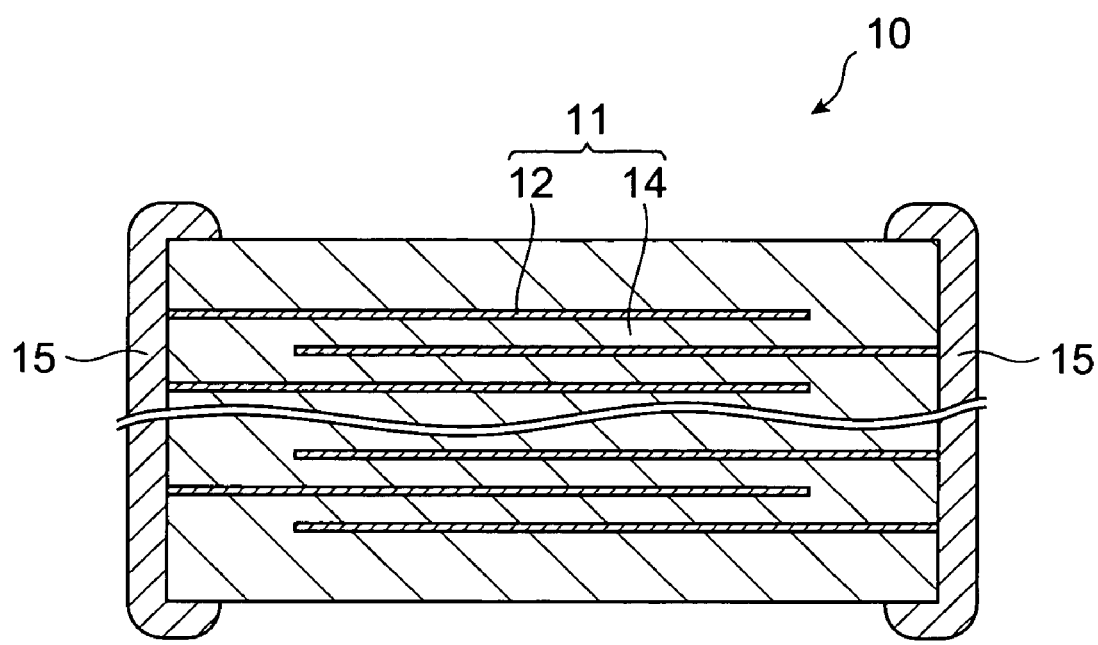
FIG. 1 is a drawing schematically showing a cross-section of a laminated ceramic capacitor according to one aspect of the invention.

Hereafter, one aspect of the invention will be described referring to the drawings. In the drawings, the same elements are assigned identical symbols, and their description will not repeated.

FIG. 1 is a drawing schematically showing a cross-section of a laminated ceramic capacitor according to this aspect. A capacitor 10 (laminated capacitor) comprises a rectangular parallelepiped-shaped capacitor body 11 wherein internal electrodes 12 and a dielectric layer 14 are alternately laminated, external electrodes 15 being respectively provided on opposite end faces of this capacitor body 11.

In this capacitor 10, the internal electrodes 12 are formed so that one end of the internal electrode 12 is exposed on the end face of the capacitor body 11, and the internal electrodes 12 are laminated so that the ends thereof is alternately exposed on the opposite end face of the capacitor body 11. The component materials of the internal electrodes 12 are not particularly limited provided that they are electrically conducting materials usually used for the internal electrodes of laminated electrical elements. Examples of such electrically conducting materials are Ni and Ni alloys. The Ni alloy preferably contains 95 mass % or more of Ni, and contains at least one of Mn, Cr, Co and Al.

The external electrodes 15 are respectively provided on the end faces onto which the ends of the internal electrodes 12 in the capacitor body 11 project. Thereby, the internal electrodes 12 and external electrodes 15 are connected, and electrical conductivity between the two can be achieved. The external electrode 15 may be of Cu or Cu alloy, Ni or Ni alloy, Ag or Ag alloy (for example, Ag—Pd alloy), or Sn or Sn alloy. From the viewpoint of reducing the manufacturing cost of the capacitor 10, it is preferred to use relatively low-cost Cu or Ni, or alloys thereof.

The dielectric layer 14 comprises a dielectric material including a ceramic material. The ceramic material contained in the dielectric material may be a high dielectric constant ceramic material known in the art usually used for ceramic capacitors. For example, it may be a barium titanate ($BaTiO_3$) material, a lead complex perovskite compound material, or a strontium titanate ($SrTiO_3$) material.

Among the above ceramic materials, from the viewpoint that it has a superior dielectric constant and can achieve a high electrostatic capacitance, $BaTiO_3$ which is a complex compound having Ba and Ti as its principal ingredients, is preferred. As a result of this $BaTiO_3$ material, the improvement of insulating properties due to the high resistance layer 24 is particularly satisfactory.

The $BaTiO_3$ material is preferably a material wherein the basic ingredient is $BaTiO_3$, and wherein the Ba or Ti in this composition may be substituted by other metal elements. For example, in the material, part of the Ba may be substituted by Ca or Sr, or part of the Ti may be substituted by Zr. The $BaTiO_3$ material may be for example "$[(Ba_{1-x-y}Ca_xSr_y)O]_m(Ti_{1-x}Zr_x)O_2$". Herein, x is 0-0.25 but preferably 0.05-0.10, y is 0-0.05 but preferably 0-0.01, z is 0.1-0.3 but preferably 0.15-0.20, and m is 1.000-1.020 but preferably 1.002-1.015, respectively.

In addition to the ceramic material mentioned above, the dielectric material may contain an ingredient which can enhance the stability and insulating properties of the dielectric layer 14. This ingredient may be for example a simple substance such as Sr, Y, Gd, Tb, Dy, V, Mo, Zn, Cd, Ti, Ca, Sn, W, Mn, Si, or P, or an oxide thereof.

Figure 2:
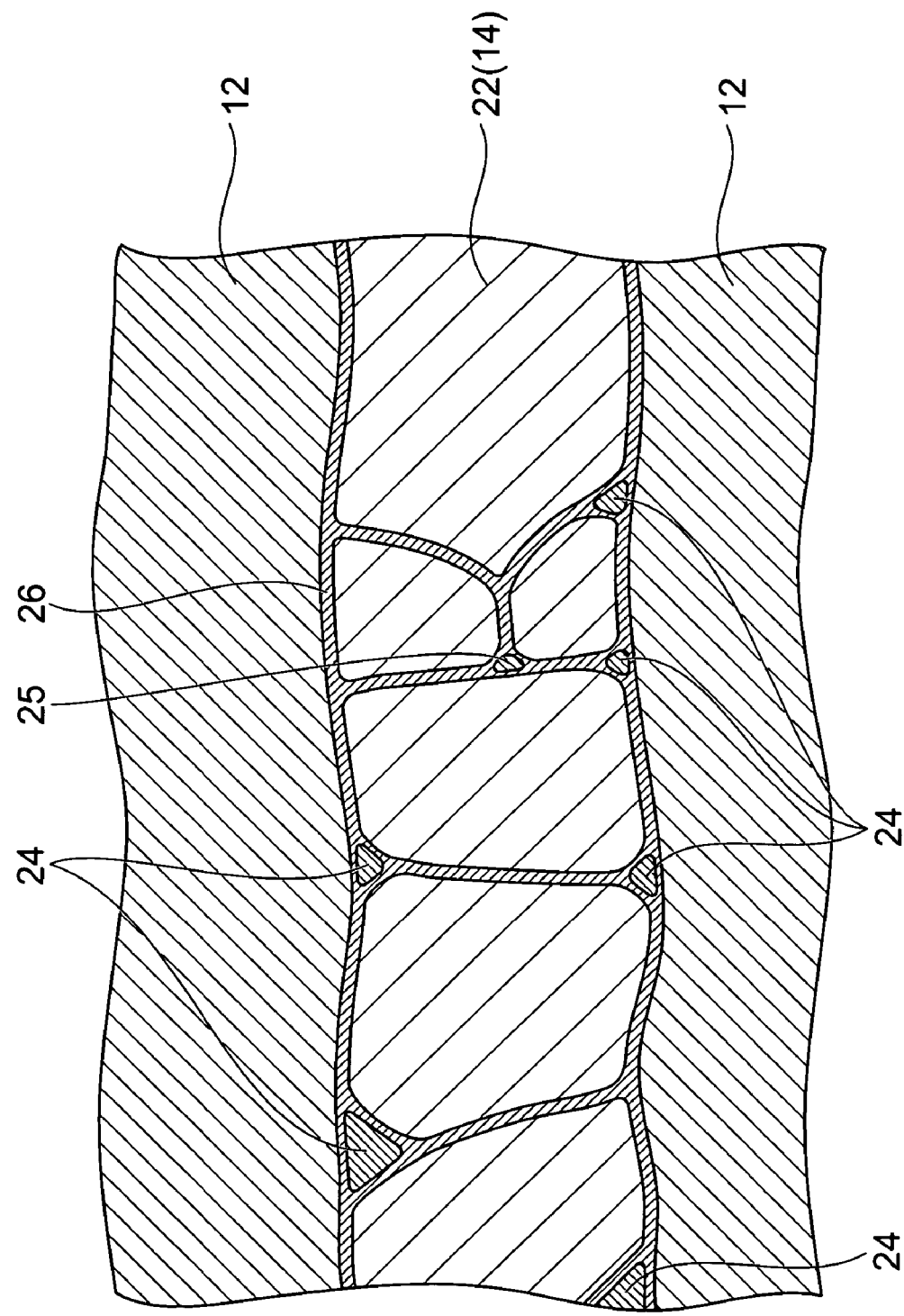
FIG. 2 is a schematic view showing an enlargement of the structure near the interface between an internal electrode and a dielectric layer of the laminated ceramic capacitor shown in FIG. 1.

Here, referring to FIG. 2, the structure near the interface of the internal electrode 12 and dielectric layer 14 will now be described. FIG. 2 is a schematic view showing an enlargement of the structure in the vicinity of the interface between the internal electrodes 12 and the dielectric layer 14 of the laminated ceramic capacitor shown in FIG. 1.

As shown in the figure, the dielectric layer 14 has a structure wherein plural crystalline particles 22 (particles) are arranged. A particle boundary phase 26 comprising the ceramic material which contains the same kind of elements as the particles 22, is formed around these crystalline particles 22. Regions 24 (first regions) containing at least one element selected from among a group comprising Si, Li and B, are scattered between the internal electrodes 12 and dielectric layer 14. Regions 25 (second regions) comprising these elements are also scattered in inner layer parts of the dielectric layer 14.

The crystalline particles 22 are formed from the aforesaid dielectric material. In the capacitor 10 according to this aspect of the invention, this dielectric layer 14 has a site (one layer-one particle structure) comprising only one of the crystalline particles 22 in its thickness direction. This one layer-one particle structure is preferably formed to the extent of about 10-80%, but more preferably about 40%, relative to the total length in the width direction of the dielectric layer 14.

The proportion of this one layer-one particle structure may be computed as follows. First, the capacitor 10 is cut in a direction perpendicular to the internal electrodes 12. Next, this cut surface is observed, the particle diameters of the crystalline particles 22 which are exposed on the surface are measured, and the average particle diameter is computed. Straight lines perpendicular to the internal electrode 12 are drawn at intervals of the aforesaid average particle diameter on the cut surface, and the number of these in the one layer-one particle structure is counted. The proportion of straight lines in the one layer-one particle structure relative to the total number of straight lines is computed, and this is taken as the proportion of the one layer-one particle structure in the dielectric layer 14.

the particle boundary phase 26 is a phase containing the same kind of elements as those of the dielectric material. However, the composition of this particle boundary phase 26 does not necessarily need to be the same as that of the dielectric material. The particle boundary phase 26 may contain impurities other than those of the dielectric material to the extent that the properties of the dielectric layer are not altered.

The regions 24 and regions 25 are regions having a different composition or crystalline structure from those of the crystalline particles 22 and particle boundary phase 26. These regions 24, 25 may be particles containing at least one of the elements Si, Li and B, and may be a precipitate phase formed by precipitation of the elements contained in this phase 26. In these regions 24 and 25, Si, Li, or B are present in the form of simple substances or oxides. As suitable forms of the latter oxides, $SiO_2$, LiO and $B_2O_3$ may respectively be mentioned.

As the element contained in the regions 24 and 25, among Si, Li and B, Si is preferred and Si oxide (for example, $SiO_2$) is more preferred. In a capacitor 10 having the regions 24 containing Si or Si oxide, the adhesion properties between the internal electrodes 12 and dielectric layer 14 are particularly good. The capacitor 10 having the regions 24 and 25 containing Si or Si oxide has the advantage that a low sintering temperature can be employed during manufacture. The regions 24, 25, in addition to the aforesaid single elements or oxides, may also contain the same elements as those of the material forming the crystalline particles 22 or particle boundary phase 26.

In the capacitor 10, the regions 24 are formed in parts enclosed by two or more crystalline particles 22 and the internal electrodes 12, and the regions 25 are formed in parts enclosed by only three or more crystalline particles 22. Here, since the dielectric layer 14 has a one layer-one particle structure as described above, in the dielectric layer 14, the number of the latter parts is much less than the number of the former parts. For this reason, in the capacitor 10, the regions 25 are less numerous than the regions 24.

Thus, in the capacitor 10, the regions 24 are more widely scattered than the regions 25, and in the dielectric layer 14, there are few of the regions 25. As the elements Si, Li and B contained in these regions 24, 25 are low resistance materials as described above, in the prior art when they were added as sintering agents, they dispersed uniformly in the dielectric layer and reduced its insulation resistance. On the other hand, in the capacitor 10, since there are very few of the regions 25 in the inner layer parts of the dielectric layer 14, the decrease of insulating properties due to addition of the elements Si, Li and B, can be suppressed.

In the dielectric layer 14, the elements Si, Li and B, may be contained not only in the regions 24, 25, but also for example in the particle boundary phase 26. This may occur when the regions 24, 25 are formed by the aforesaid precipitation.

Likewise, although the crystalline particles 22 may also contain the elements Si, Li and B, from the viewpoint of fully maintaining the insulating properties of the dielectric layer 14, it is desirable that these elements are essentially not contained therein. If the crystalline particles 22 do contain the aforesaid elements, their amount is preferably less than 5 mass %.

The blending ratio of the elements Si, Li, B in the crystalline particles 22, the regions 24, 25 or the particle boundary phase 26, may be expressed for example as a proportion (mass %) of the elements contained in predetermined volumes thereof relative to the total mass of these predetermined volumes. The blending ratio of these metal elements may be computed for example by applying a compositional analysis known in the art. The compositional analysis technique may be for example Energy Dispersion X-ray Spectroscopy (EDS) or the like.

The capacitor 10 according to this aspect of the invention may have a size measuring about 1.5-1.7 mm in length× 0.7-0.9 mm in width. In the capacitor 10 having this size, the thickness of the internal electrodes 12 is preferably about 1-5 μm but more preferably about 1-3 μm, and the thickness of the external electrodes is preferably about 10-50 μm. The thickness of the dielectric layer 14 is preferably 1-6 μm, but more preferably 1-4 μm.

The capacitor 10 having the aforesaid construction may be manufactured for example by applying a laminated ceramic capacitor manufacturing technique known in the art which is described below.

First, the starting materials for the ceramic material forming the dielectric material are prepared, and weighed. Next, starting material compounds of Si, Li or B, or other ingredients, are added to this starting material mixture, and wet-mixed by a ball mill or the like. After drying this mixture, it is temporarily sintered at about 800-1300° C.

The obtained temporary sintered composition is then crushed to a predetermined particle size by a jet mill or ball mill. A binder or a plasticizer is then mixed with this crushed product to prepare a dielectric paste. At the same time, the electrically conducting material of the internal electrodes 12 is mixed with an organic vehicle containing a binder and solvent to prepare an internal electrode paste.

By alternately coating and laminating this dielectric paste and internal electrode paste, a laminated body wherein layers of the dielectric paste and internal electrode paste are alternately laminated, is obtained. A green chip is then obtained by cutting this laminated body to a predetermined size, and the binder is removed by heating this green chip.

Subsequently, permanent sintering is performed at a temperature of about 1200-1400° C. in an inert atmosphere such as $N_2$ or $H_2$ to obtain the capacitor body 11. A paste for forming the external electrodes 15 is then sintered on both ends of the capacitor body 11 to form the capacitor 10.

In such a manufacturing method, as the method of forming the regions 24 and 25, the elements Si, Li, and B contained in the boundary phase 26 may be for example precipitated in the particle boundary phase 26 as mentioned above. This precipitation can be controlled by varying the addition amounts of the starting material compounds of Si, Li, B, and the formation of the regions 24, 25 in the capacitor 10 can thereby be controlled.

Figure 3:
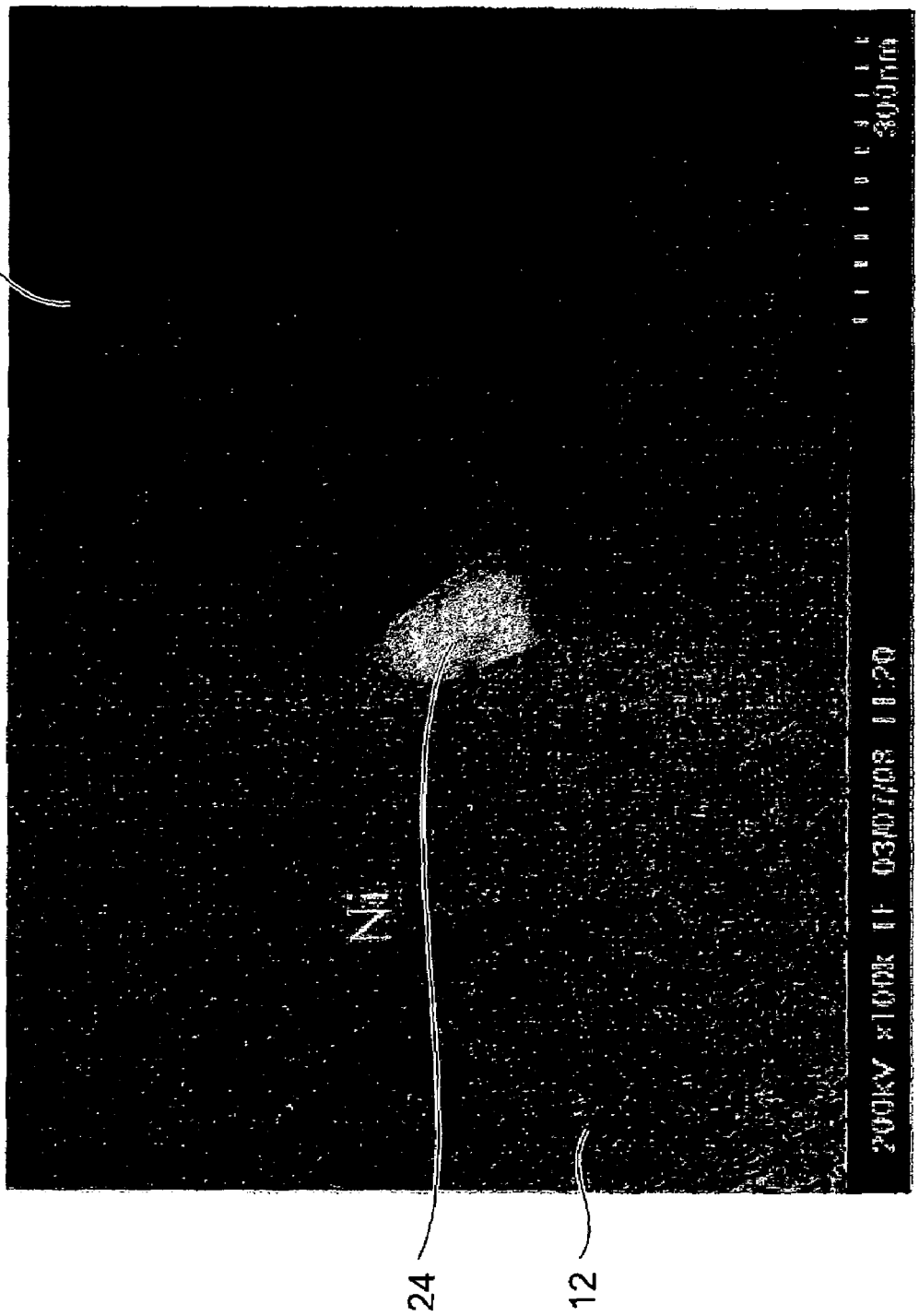
FIG. 3 is a transmission electron micrograph showing the structure near the interface between the internal electrode and dielectric layer.

Here, referring to FIG. 3, the structure near the interface of the internal electrodes and dielectric layer in the capacitor according to this aspect of the invention will now be described. FIG. 3 is a transmission electron micrograph showing the structure near the interface of the internal electrodes and dielectric layer. In FIG. 3, 12 is an internal electrode, 14 is a crystalline particle (dielectric layer), and 24 is a region containing at least one of Si, Li and B (first region), respectively. Thus, the region 24 is formed in a region surrounded by two of the crystalline particles 14 and the internal electrode 12. As a result of performing an elemental analysis using EDS, it was found that the region 24 contains 38.7 mass % BaO, 4.7% mass % $TiO_2$, 1.9 mass % $ZrO_2$, 0.8 mass % $Y_2O_3$, 0.4 mass % MnO, 0.8 mass % $V_2O_5$, 49.4 mass % $SiO_2$ and 3.3 mass % NiO. These are values obtained by converting each element to the oxide. Thus, it was confirmed that in the capacitor 10 according to this aspect, the region 24 containing Si is formed between the internal electrodes 12 and dielectric layer 14.

As mentioned above, since the capacitor 10 according to this aspect has the thin dielectric layer 14 containing a one layer-one particle structure, it has a very large electrostatic capacitance. In this capacitor 10, the regions 24 containing an element selected from among a group comprising Si, Li and B are scattered between the internal electrodes 12 and dielectric layer 14. For this reason, the internal electrodes 12 and dielectric layer 14 are firmly stuck together compared with the case where they are stuck together directly.

As a result, although the capacitor 10 has the thin dielectric layer 14 having a one layer-one particle structure, delamination between the internal electrodes 12 and dielectric layer 14 does not occur easily.

In the prior art, the elements Si, Li, B were dispersed in the dielectric layer as sintering agents, and had the effect of reducing the insulation resistance of the capacitor. On the other hand, in the capacitor 10, although the regions 24 and 25 containing these elements are formed, the regions 25 in the dielectric layer are formed to a far less extent. For this reason, in the capacitor 10, the decrease of insulation resistance due to the presence of the elements Si, Li and B, is much less than in the laminated ceramic capacitor of the prior art.

As described above, the invention provides a laminated ceramic capacitor wherein delamination between the internal electrodes and dielectric layer does not occur easily even if a thin dielectric layer containing a one layer-one particle structure is formed.

What is claimed is:

1. A laminated ceramic capacitor, comprising:
    a pair of electrodes;
    a dielectric layer disposed between said pair of electrodes, formed of a dielectric material comprising a ceramic material, wherein:
    said dielectric layer contains particles of said dielectric material and has a site formed of only one of these particles in its thickness direction, and
    regions containing at least one type of element selected from among a group comprising Si, Li and B are scattered between said electrodes and said dielectric layer.

2. The laminated ceramic capacitor according to claim 1, wherein said regions are surrounded by said internal electrodes and two or more of said particles.

3. The laminated ceramic capacitor according to claim 1 or 2, wherein said regions comprise mainly Si.

4. A laminated ceramic capacitor, comprising:
    a pair of electrodes;
    a dielectric layer disposed between said pair of electrodes, formed of a dielectric material comprising a ceramic material, wherein:
    said dielectric layer contains particles of said dielectric material and has a site formed of only one of these particles in its thickness direction;
    first regions containing at least one type of element selected from among a group comprising Si, Li and B are scattered between said electrodes and said dielectric layer;
    second regions containing at least one type of element selected from among a group comprising Si, Li and B are scattered in said dielectric layer; and
    said first region is scattered more numerous than said second region.

5. The laminated ceramic capacitor according to claim 4, wherein said first regions are surrounded by said internal electrodes and two or more of said particles, and said second regions are surrounded by only three or more of said particles.

6. The laminated ceramic capacitor according to claim 4 or 5, wherein said first regions and said second regions comprise mainly Si.

7. The laminated ceramic capacitor according to any of claims 1 or 4, wherein said ceramic material is a complex oxide having Ba and Ti as principal components.

* * * * *